(12) United States Patent
Chen et al.

(10) Patent No.: US 11,192,493 B2
(45) Date of Patent: Dec. 7, 2021

(54) AUTO-REGULATED VEHICLE HEADLAMP, AUTOMATIC REGULATION METHOD, AND VEHICLE

(71) Applicant: HASCO VISION TECHNOLOGY CO., LTD., Shanghai (CN)

(72) Inventors: Zhaoyu Chen, Shanghai (CN); Xie Dai, Shanghai (CN)

(73) Assignee: HASCO VISION TECHNOLOGY CO., LTD, Shanghai (CN)

( * ) Notice: Subject to any disclaimer, the term of this patent is extended or adjusted under 35 U.S.C. 154(b) by 300 days.

(21) Appl. No.: 16/491,249

(22) PCT Filed: Mar. 27, 2019

(86) PCT No.: PCT/CN2019/079926
§ 371 (c)(1),
(2) Date: Sep. 5, 2019

(87) PCT Pub. No.: WO2020/181584
PCT Pub. Date: Sep. 17, 2020

(65) Prior Publication Data
US 2021/0339674 A1    Nov. 4, 2021

(30) Foreign Application Priority Data
Mar. 14, 2019  (CN) .......................... 201910193037.3

(51) Int. Cl.
*B60Q 1/14*    (2006.01)
*B60Q 1/00*    (2006.01)
(Continued)

(52) U.S. Cl.
CPC ........... *B60Q 1/143* (2013.01); *B60Q 1/0023* (2013.01); *F21S 41/13* (2018.01); *F21S 41/141* (2018.01);
(Continued)

(58) Field of Classification Search
CPC .......... F21S 41/13; F21S 41/141; F21S 41/40; F21S 41/25; B60Q 1/0023; B60Q 1/143
See application file for complete search history.

(56) References Cited

U.S. PATENT DOCUMENTS

2015/0294161 A1* 10/2015 Schamp ............... B60G 17/019
                                                                  701/37
2018/0024640 A1*  1/2018 Yeom .................... G06K 9/2018
                                                                  180/218

(Continued)

*Primary Examiner* — William N Harris
(74) *Attorney, Agent, or Firm* — Hogan Lovells US LLP (57) ABSTRACT

Provided are an auto-regulated vehicle headlamp, an automatic regulation method and a vehicle. The auto-regulated vehicle headlamp includes: a projector assembly capable of projecting infrared rays, configured to project infrared stripes onto a traveling road-surface; the infrared stripes being constituted by alternate bright and dark stripes so that corresponding distorted stripes can be formed when an object, during appearing or disappearing on the traveling road-surface, has a changed contour; a camera configured to capture image information on the distorted stripes; an image processor in data connection with the camera and configured to acquire the image information and generate a headlamp control command accordingly; a matrix headlamp including a plurality of LED light sources; and a first controller in data connection with the matrix headlamp and the image processor, configured to acquire the headlamp control command and adjust the number of the LED light sources to be activated and their brightness.

20 Claims, 5 Drawing Sheets

(51) Int. Cl.
*F21S 41/141* (2018.01)
*F21S 41/13* (2018.01)
*F21S 41/25* (2018.01)
*F21S 41/40* (2018.01)
*F21W 107/10* (2018.01)
*F21Y 115/10* (2016.01)

(52) U.S. Cl.
CPC ............... *F21S 41/25* (2018.01); *F21S 41/40* (2018.01); *B60Q 2300/30* (2013.01); *F21W 2107/10* (2018.01); *F21Y 2115/10* (2016.08)

(56) References Cited

U.S. PATENT DOCUMENTS

2020/0011501 A1* 1/2020 Kunii ........................ F21V 9/40
2021/0155149 A1* 5/2021 Sugiyama ............... F21S 41/40

* cited by examiner

AUTO-REGULATED VEHICLE HEADLAMP, AUTOMATIC REGULATION METHOD, AND VEHICLE

CROSS-REFERENCE TO RELATED APPLICATIONS

The present disclosure claims priority to Chinese Patent Application No. 2019101930373, filed with the Chinese Patent Office on Mar. 14, 2019, entitled "Auto-regulated Vehicle Headlamp and Automatic Regulation Method", which is incorporated herein by reference in its entirety.

TECHNICAL FIELD

The present disclosure relates to the technical field of vehicles, and in particular to an auto-regulated vehicle headlamp, an automatic regulation method, and a vehicle.

BACKGROUND ART

With the continuous development and update of modern science and technology, more and more intelligent products appear in our daily lives. As products in which high technologies are integrated, vehicles are becoming more and more intelligent, and the technological level of vehicle headlamps often determines the safety of vehicles.

At present, the main illumination functions of vehicle headlamps include low beam (dipped beam) illumination and high beam (main beam) illumination, which need to be manually adjusted by a driver in actual use. However, when the driver fails to turn off the high-beam lamp in time, pedestrians and occupants in an opposite vehicle may be dazzled, resulting in an occurrence of an accident. Some prior technologies that can achieve conversion between different lighting patterns often require very high cost, which may greatly increase the cost of the entire vehicle.

SUMMARY

An object of the present disclosure includes, for example, providing an auto-regulated vehicle headlamp, an automatic regulation method, and an vehicle so as to solve the technical problem of high cost of auxiliary systems for automatic control of headlamps existing in the prior art.

Embodiments of the present disclosure may be implemented as follows.

An embodiment of the present disclosure provides an auto-regulated vehicle headlamp, comprising:
a projector assembly capable of projecting infrared rays, configured to project infrared stripes onto a traveling road-surface to which the vehicle is traveling;
  the infrared stripes being constituted by alternate bright and dark stripes so that corresponding distorted stripes can be formed when an object, during appearing or disappearing on the traveling road-surface, has a changed contour;
a camera configured to capture image information on the distorted stripes;
an image processor, the image processor being in data connection with the camera and configured to acquire the image information and generate a headlamp control command according to the image information;
a matrix headlamp and a first controller, the matrix headlamp comprising a plurality of LED light sources; the first controller being in data connection with the matrix headlamp and the image processor and configured to acquire the headlamp control command and adjust the number of the LED light sources to be activated and a brightness of the LED light sources according to the headlamp control command.

Optionally, the infrared stripes are constituted by alternate bright and dark horizontal stripes.

Optionally, the projector assembly comprises a first infrared projector, the first infrared projector being configured to project the alternate bright and dark horizontal stripes onto the traveling road-surface.

Optionally, the auto-regulated vehicle headlamp further comprises a second controller;
the second controller is in control connection with the first infrared projector and is configured to control the first infrared projector to project the horizontal stripes onto the traveling road-surface in a flickering manner.

Optionally, the infrared stripes are constituted by alternate bright and dark vertical stripes.

Optionally, the projector assembly comprises a second infrared projector, the second infrared projector being configured to project the alternate bright and dark vertical stripes onto the traveling road-surface.

Optionally, the auto-regulated vehicle headlamp further comprises a third controller;
the third controller is in control connection with the second infrared projector and is configured to control the second infrared projector to project the vertical stripes onto the traveling road-surface in a flickering manner.

Optionally, the infrared stripes are constituted by alternate bright and dark horizontal stripes and vertical stripes; and the horizontal stripes and the vertical stripes are alternately arranged.

Optionally, the projector assembly comprises a first infrared projector and a second infrared projector;
the first infrared projector is configured to project alternate bright and dark horizontal stripes onto the traveling road-surface;
the second infrared projector is configured to project alternate bright and dark vertical stripes onto the traveling road-surface; and
the first infrared projector and the second infrared projector project simultaneously to form a pattern constituted by superimposing the alternate bright and dark horizontal stripes and vertical stripes.

Optionally, the projector assembly comprises:
an infrared lamp configured to project the infrared rays; and
a mask member provided with a plurality of parallel strip-shaped light transmission holes and located at an exit from which the infrared rays are projected, so that the infrared rays projected by the infrared lamp are directly emitted to the mask member and pass through the strip-shaped light transmission holes in order to form the infrared stripes.

Optionally, the projector assembly comprises:
an infrared lamp configured to project the infrared rays;
a mask member provided with a plurality of parallel strip-shaped light transmission holes and located at an exit from which the infrared rays are projected; and
a reflector assembled correspondingly to the infrared lamp, and configured to reflect the infrared rays projected by the infrared lamp to the mask member to form the infrared stripes through the strip-shaped light transmission holes.

Optionally, the mask member is a grating.

Optionally, the mask member comprises a frame and a plurality of masking blades disposed on the frame, and the plurality of masking blades are disposed in parallel to form the strip-shaped light transmission holes by gaps between the adjacent masking blades.

Optionally, the auto-regulated vehicle headlamp further comprises:

a lens assembly, wherein the lens assembly comprises a lens holder and a lens;

the lens is mounted at the exit from which the infrared rays are projected via the lens holder, so that the infrared stripes are projected through the lens to the traveling road-surface.

Optionally, the mask member is located at a position of a focal plane of the lens.

Optionally, the auto-regulated vehicle headlamp further comprises:

a heat sink; and the infrared lamp is disposed on the heat sink, and is configured such that heat is dissipated from the infrared lamp by the heat sink.

Optionally, the image information includes vehicle image information;

the first controller is in data connection with the matrix headlamp and the image processor, and is configured to acquire the headlamp control command and adjust the number of the LED light sources to be activated and brightness of the LED light sources according to the headlamp control command.

Optionally, the image information includes pedestrian image information, and the headlamp control command includes a flicker adjustment command corresponding to the pedestrian image information;

the first controller is in data connection with the matrix headlamp and the image processor, and is further configured to acquire the flicker adjustment command and control the activation of the flicker of the LED light sources according to the flicker adjustment command.

An embodiment of the present disclosure further provides a method for automatically regulating a vehicle headlamp, which is implemented according to the auto-regulated vehicle headlamp, comprising the following steps:

projecting infrared stripes onto the traveling road-surface by the projector assembly;

the infrared stripes being constituted by alternate bright and dark stripes so that corresponding distorted stripes can be formed when an object, during appearing or disappearing on the traveling road-surface, has a changed contour;

using the camera to capture image information on the distorted stripes;

using the image processor to acquire the image information and generate a headlamp control command according to the image information; and using the first controller to acquire the headlamp control command and adjust the number of the LED light sources to be activated and the brightness of the LED light sources according to the headlamp control command.

An embodiment of the present disclosure further provides a vehicle, comprising the auto-regulated vehicle headlamp described above.

The embodiments of the present disclosure include, for example, the following advantageous effects compared to the prior art:

The projector assembly of the vehicle headlamp projects infrared stripes onto the traveling road-surface. Once an object appears on the traveling road-surface, the infrared stripes are irradiated onto the surface of the object and change with the contour of the object. The camera of the vehicle headlamp is capable of capturing the shape of the real-time distorted stripes projected onto the object on the traveling road-surface. The image processor generates a headlamp control command according to the image information, and the first controller adjusts the number of LED light sources to be activated and the brightness of the LED light sources according to the headlamp control command, whereby different lighting patterns are projected to achieve the purpose of self-adaptative illumination of the headlamp, and realize the intelligentization of the vehicle lamp. The different lighting patterns are obtained by turning on, darkening, or turning off some of the LED light sources within the matrix headlamp depending on different traveling road-surface conditions, whereby the functions such as anti-dazzle, warning for pedestrians, and illumination at curves in the road can be achieved. In this way, the cost of the vehicle will be greatly reduced while achieving the same effect of automatic regulation of the headlamp.

BRIEF DESCRIPTION OF DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limiting its scope. It would be understood by those of ordinary skill in the art that other relevant drawings could also be obtained from these drawings without any inventive effort.

Reference Numerals: 1—projector assembly; 11—infrared lamp; 12—mask member; 121—frame; 122—masking blade; 123—strip-shaped light transmission hole; 13—reflector; 14—lens assembly; 141—lens holder; 142—lens; 16—heat sink; 101—first infrared projector; 102—second infrared projector; 2—camera, 3—image processor; 4—matrix headlamp; 41—LED light source; 5—first controller; 6—second controller; 7—third controller.

DETAILED DESCRIPTION OF EMBODIMENTS

In order to make the objects, technical solutions and advantages of the embodiments of the present disclosure more clear, the technical solutions of the embodiments of the present disclosure will be described below clearly and comprehensively with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts would fall within the scope of the present disclosure as claimed.

It should be noted that similar reference numerals and letters refer to similar items in the following figures, and thus once an item is defined in one figure, it may not be further defined or explained in the following figures.

In the description of the present disclosure, it should be noted that orientation or positional relationships indicated by the terms such as "center", "up", "down", "left", "right", "vertical", "horizontal", "inside", and "outside", if present, are the orientation or positional relationships shown based on the figures, or the orientation or positional relationships in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure.

In addition, the terms such as "first", "second", and "third", if present, are used for distinguishing the description only, and should not be understood as an indication or implication of relative importance.

In addition, the terms such as "horizontal", "vertical", "overhang", if present, do not mean that a component is required to be absolutely horizontal or overhanging, but mean that the component may be slightly inclined. For example, the term "horizontal" simply means that its direction is more horizontal relative to the term "vertical", and does not mean that the member must be completely horizontal, but means that the member may be slightly inclined.

In the description of the present disclosure, it should also be noted that terms such as "disposed", "mounted", "coupled", and "connected", if present, should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure could be understood by those of ordinary skill in the art according to specific situations.

It should be noted that the features in the embodiments of the present disclosure may be combined with each other without conflict.

A conversion between different lighting patterns can be achieved by the MATRIX headlamp technology in the prior art, which consists of LED light sources of multiple pixels. However, for the current automatic control of MATRIX headlamps, high-end vehicle models are often equipped with Advanced Driver Assistance Systems (ADAS for short), while the development of the ADAS system is extremely complicated and costly. The present embodiment provides an auto-regulated vehicle headlamp, by which this technical problem can be improved.

As shown in FIG. 1 to FIG. 9, an auto-regulated vehicle headlamp is provided according to the present embodiment, including:

a projector assembly 1 capable of projecting infrared rays, and configured to project infrared stripes onto a traveling road-surface to which the vehicle is traveling;

the infrared stripes being constituted by alternate bright and dark stripes so that corresponding distorted stripes can be formed when an object, during appearing or disappearing on the traveling road-surface, has a changed contour;

a camera 2 configured to capture image information on the distorted stripes;

an image processor 3, wherein the image processor 3 is in data connection with the camera 2 and configured to acquire the image information and generate a headlamp control command according to the image information; and a matrix headlamp 4 and a first controller 5, wherein the matrix headlamp 4 comprises a plurality of LED light sources; the first controller 5 is in data connection with the matrix headlamp 4 and the image processor 3 and configured to acquire the headlamp control command and adjust the number of LED light sources 41 to be activated and the brightness of the LED light sources 41 according to the headlamp control command.

It should be noted that the data connection mentioned herein may also be understood as communication, and there are many ways to implement the connection, such as a wireless connection, or a wired connection via a data line. Moreover, referring to FIG. 1 and FIG. 2, the first controller 5 may be integrated into the matrix headlamp 4 to form one member, or the first controller 5 and the matrix headlamp 4 may be two independent members, respectively.

According to the configurations described above, the vehicle headlamps are disposed in the front of the vehicle. When the vehicle is traveling, the projector assembly 1 of the vehicle headlamp projects infrared stripes onto the traveling road-surface. Once an object appears on the traveling road-surface, the infrared stripes are irradiated onto the surface of the object, the irradiated object diffusely reflects the infrared stripes, and the infrared stripes are modulated as the contour of the object changes, so that the shape of the infrared stripes is distorted and deformed to form distorted stripes corresponding to the contour of the object. Meanwhile, the camera 2 of the vehicle headlamp is capable of capturing the shape of the real-time distorted stripes projected onto the object on the traveling road-surface, and then the image processor 3 calculates the form of the distorted stripes, so that image information on the distorted stripes can be obtained, and information such as undulations and potholes of the traveling road-surface, the distance from an obstacle, and the position, shape, size, and height of the obstacle can be calculated from the image information. The image processor 3 generates a headlamp control command according to the image information, and the first controller 5 adjusts the number of LED light sources 41 to be activated and a brightness of the LED light sources 41 according to the headlamp control command, whereby different lighting patterns are projected to achieve the purpose of self-adaptative illumination of the headlamp, and realize the intelligentization of the vehicle lamp. The different lighting patterns may be understood as turning on, darkening, or turning off some of the LED light sources of the matrix headlamp 4 depending on different traveling road-surface conditions, whereby the functions such as anti-dazzle, warning for pedestrians, and illumination at curves in the road can be achieved.

Optionally, the infrared stripes are constituted by alternate bright and dark horizontal stripes. Alternatively, the infrared stripes are constituted by alternate bright and dark vertical stripes. Alternatively, the infrared stripes are constituted by alternate bright and dark horizontal stripes and vertical stripes; and the horizontal stripes and the vertical stripes are alternately arranged.

Therefore, the alternate bright and dark stripes projected by the projector assembly 1 may be individual horizontal stripes or individual vertical stripes, or of course may be a pattern of alternating bright and dark infrared stripes with superimposed effects emitted from two or more combined projector assemblies 1. In one mode, two projector assemblies 1 are combined to emit a pattern constituted by superimposing the alternate bright and dark horizontal stripes and vertical stripes. The pattern formed by the horizontal stripes is advantageous to the calculation of conditions in the front and rear of the traveling road-surface, and the pattern formed by the vertical stripes is advantageous to the calculation of the conditions on the left and right of the traveling road-surface. The horizontal stripes and the vertical stripes may coexist to improve the resolution of monitoring of the traveling road-surface.

Optionally, the projector assembly 1 comprises a first infrared projector 101, wherein the first infrared projector 101 is configured to project alternate bright and dark horizontal stripes onto the traveling road-surface. Similarly, the projector assembly 1 comprises a second infrared projector 102, wherein the second infrared projector 102 is configured to project alternate bright and dark vertical stripes onto the traveling road-surface.

Optionally, the projector assembly 1 comprises a first infrared projector 101 and a second infrared projector 102, wherein the first infrared projector 101 and the second infrared projector 102 may project alternate bright and dark horizontal stripes and alternate bright and dark vertical stripes, respectively, or project simultaneously to form a pattern constituted by superimposing the alternate bright and dark horizontal stripes and vertical stripes.

In other words, the first infrared projector 101, or the second infrared projector 102, or a combination of the first infrared projector 101 and the second infrared projector 102 may be selected and used as the projector assembly 1. Moreover, the number of the first infrared projectors 101 and the second infrared projectors 102 is not limited.

Figure 4:
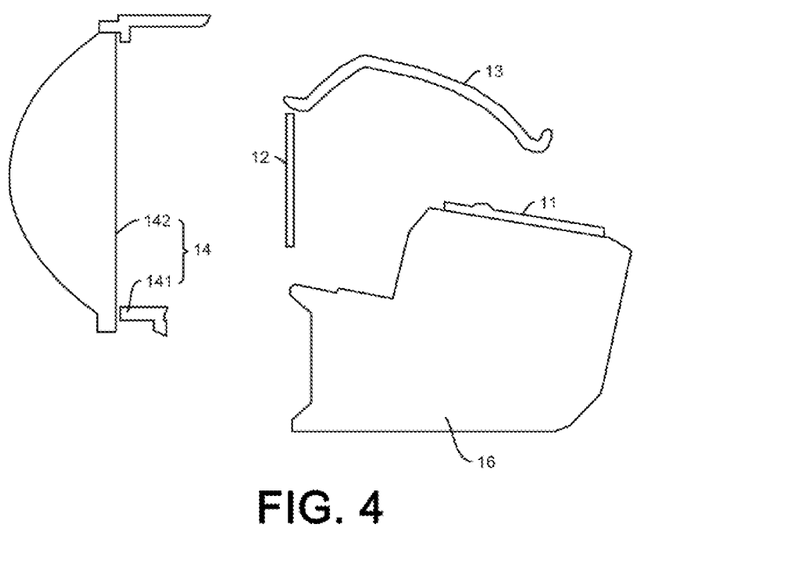
FIG. 4 is a schematic structural view of a projector assembly according to an embodiment of the present disclosure.
Figure 5:
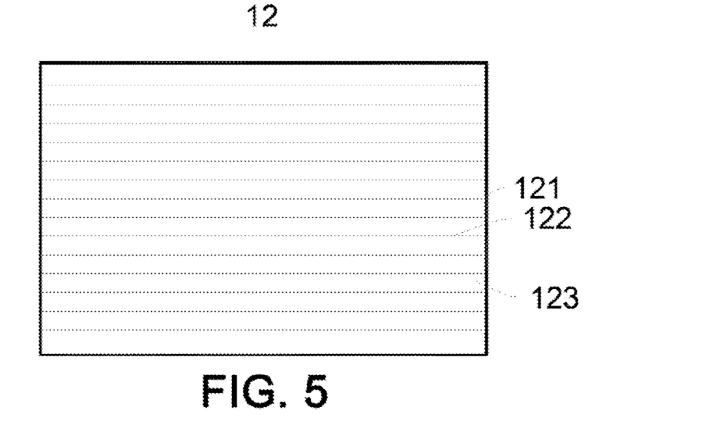
FIG. 5 is a schematic view of a horizontal mask member according to an embodiment of the present disclosure.
Figure 6:
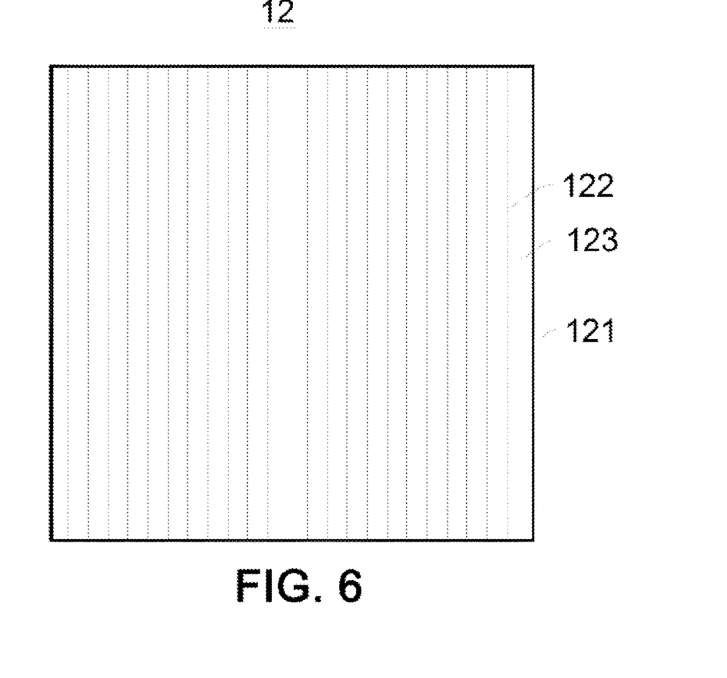
FIG. 6 is a schematic view of a vertical mask member according to an embodiment of the present disclosure.

Optionally, referring to FIG. 4 to FIG. 6, the projector assembly 1 comprises:

an infrared lamp 11 configured to project infrared rays;

a mask member 12 provided with a plurality of parallel strip-shaped light transmission holes 123 and located at an exit from which the infrared rays are projected; and a reflector 13 assembled correspondingly to the infrared lamp 11, and configured to reflect the infrared rays projected by the infrared lamp 11 to the mask member 12 to form infrared stripes through the strip-shaped light transmission holes 123.

It can be understood that when the infrared rays are projected onto the mask member 12, the infrared rays would pass through the strip-shaped light transmission holes 123, thus after being projected from the strip-shaped light transmission holes 123, alternate bright and dark horizontal stripes can be formed.

Optionally, the projector assembly 1 comprises:

an infrared lamp 11 configured to project infrared rays; and a mask member 12 provided with a plurality of parallel strip-shaped light transmission holes 123 and located at an exit from which the infrared rays are projected, so that the infrared rays projected by the infrared lamp 11 are directly emitted to the mask member 12 to form infrared stripes through the strip-shaped light transmission holes 123.

It can be understood that, unlike the configuration shown in FIG. 4, the projector assembly 1 may not have the reflector 13, and the infrared stripes may also be formed by directly irradiating the mask member 12 by the infrared lamp 11.

Optionally, the mask member is a grating.

An optical device consisting of a large number of parallel slits with equal width and equal spacing is called a grating. Generally, the commonly used grating is made by engraving a large number of parallel indentations on a glass sheet, the indentation is an opaque portion, and a smooth portion between two indentations can transmit light and is equivalent to a slit (the slit can be understood as the strip-shaped light transmission hole 123 described above). A finished grating is engraved with thousands or even tens of thousands of indentations within a width of 1 cm. Such a grating using the diffraction of the transmitted light is called a transmission grating. There is also a grating using the diffraction of the reflected light between two indentations, for example, many parallel indentations are engraved on a surface plated with a metal layer, and a smooth metallic surface between two indentations can reflect light, and such grating is called a reflection grating.

Optionally, the mask member 12 comprises a frame 121 and a plurality of masking blades 122 disposed on the frame, and the plurality of masking blades 122 are disposed in parallel to form strip-shaped light transmission holes 123 by gaps between the adjacent masking blades 122.

It can be understood that the strip-shaped light transmission holes 123 may be formed by providing multiple parallel strip-shaped holes on a plate, or may also be formed by gaps between multiple masks disposed in parallel.

Optionally, the auto-regulated vehicle headlamp further comprises:

a lens assembly 14, wherein the lens assembly 14 comprises a lens holder 141 and a lens 142;

the lens 142 is mounted at the exit from which the infrared rays are projected via the lens holder 141, so that the infrared stripes are projected through the lens to the traveling road-surface.

Optionally, the mask member 12 is located at a position of a focal plane of the lens 142.

Optionally, the auto-regulated vehicle headlamp further comprises:

a heat sink 16;

the infrared lamp 11 is disposed on the heat sink 16, and is configured such that heat is dissipated from the infrared lamp 11 by the heat sink 16.

The heat sink 16 can be used to dissipate heat from the entire device, especially the heat generated by the infrared lamp 11, so that the device can be kept in operation in a temperature-balanced state, thereby the service life of the device is prolonged, and stable quality is ensured.

It can be understood that, referring to FIG. 4, the projector assembly 1 may consist of a lens 142, a lens holder 141, a mask member 12, a reflector 13, an infrared lamp 11, a heat sink 16, etc. It can be understood that the infrared lamp 11 may be the first infrared projector 101 or the second infrared projector 102 described above.

Infrared light waves emitted from the plurality of LED light sources 41 of the matrix headlamp 4 may also be reflected by the reflector 13, the infrared light waves are blocked by the mask member 12 and then projected to form alternating bright and dark infrared stripes, and finally the infrared stripes are projected through the lens 142.

The mask member 12 may be as shown in FIG. 5 or FIG. 6, from which transverse horizontal stripes or longitudinal vertical stripes may be projected. The mask member 12 may be made of a grating, or masking blades with intervals, or a member such as a light guiding plate that can transmit light at intervals by refraction using a lens.

Figure 3:
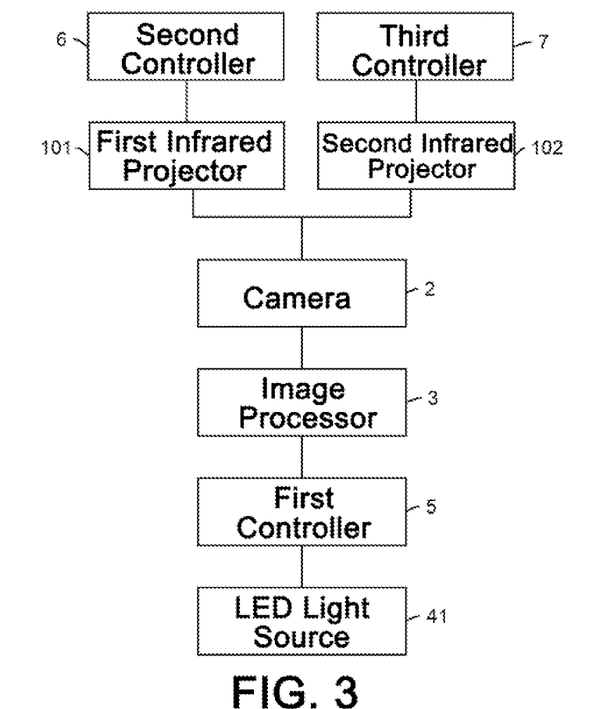
FIG. 3 is a schematic view showing a third electrical connection of a vehicle headlamp according to an embodiment of the present disclosure.

Optionally, referring to FIG. 3, the auto-regulated vehicle headlamp further comprises a second controller 6;

the second controller 6 is in control connection with the first infrared projector 101 and configured to control the first infrared projector 101 to project the horizontal stripes onto the traveling road-surface in a flickering manner.

Optionally, referring to FIG. 3, the auto-regulated vehicle headlamp further comprises a third controller 7, wherein the third controller 7 is in control connection with the second infrared projector 102 and configured to control the second infrared projector 102 to project the vertical stripes onto the traveling road-surface in a flickering manner.

Therefore, the second controller 6 and the third controller 7 can control the projector assembly 1 to activate the horizontal stripes and the vertical stripes intermittently at a certain frequency. Moreover, the emission of the horizontal stripes or vertical stripes can be activated separately under different traveling road-surface conditions, so that electric power can be saved.

Optionally, the image information includes vehicle image information;

the first controller 5 is in data connection with the matrix headlamp 4 and the image processor 3, and is configured to acquire the headlamp control command and adjust (e.g., reduce) the number of LED light sources 41 to be activated and a brightness of the LED light sources 41 according to the headlamp control command.

When the matrix headlamp 4 activates a high beam mode, the camera 2 monitors a change of the infrared stripes on the traveling road-surface, and when the infrared stripes become distorted stripes, the image processor 3 calculates the traveling road-surface condition and feeds back the same to the matrix headlamp 4. For example, when the image information includes vehicle image information, the image processor 3 generates a headlamp control command according to the image information, and the first controller 5 adjusts the number of LED light sources 41 to be activated and a brightness of the LED light sources 41 according to the headlamp control command, so that some of the LED light sources of the matrix headlamp 4 are turned off, and the matrix headlamp 4 is operated with a small number of LED light sources activated to prevent occupants in other vehicles from being dazzled by the high beam, thereby achieving the automatic anti-dazzling function of the headlamp.

Optionally, the image information includes pedestrian image information, and the headlamp control command includes a flicker adjustment command corresponding to the pedestrian image information;

the first controller 5 is in data connection with the matrix headlamp 4 and the image processor 3, and is further configured to acquire the flicker adjustment command and control the activation of the flicker of the LED light sources 41 according to the flicker adjustment command.

When the matrix headlamp 4 activates the high beam mode, the camera 2 monitors the change of the infrared stripes on the traveling road-surface, and when the infrared stripes become distorted stripes, the image processor 3 calculates the traveling road-surface condition and feeds back the same to the matrix headlamp 4. For example, when the image information includes pedestrian image information, the image processor 3 generates a headlamp control command according to the image information, and the first controller 5 controls, according to the headlamp control command, the LED light sources 41 to be turned on or some of the LED light sources to flicker at a certain frequency, whereby pedestrians can be prompted to watch out for the vehicle, and thereby the function of protecting pedestrians by the headlamp can be achieved.

An embodiment of the present disclosure further provides a method for automatically regulating a vehicle headlamp, which is implemented according to an auto-regulated vehicle headlamp, and comprises the steps of:

projecting infrared stripes onto a traveling road-surface to which the vehicle is traveling by the projector assembly 1;
the infrared stripes being constituted by alternate bright and dark stripes so that corresponding distorted stripes can be formed when an object, during appearing or disappearing on the traveling road-surface, has a changed contour;

using the camera 2 to capture image information on the distorted stripes;

using the image processor 3 to acquire the image information and generate a headlamp control command according to the image information;

using the first controller 5 to acquire the headlamp control command and adjust the number of LED light sources 41 to be activated and the brightness of the LED light sources 41 according to the headlamp control command.

Since the particular structure, functional principle and technical effects of the vehicle headlamp are all described previously in detail, repeated description thereof is omitted here. Therefore, reference can be made to the foregoing description for all the technologies related to the vehicle headlamp.

An embodiment of the present disclosure further provides a vehicle comprising the auto-regulated vehicle headlamp described above.

Figure 1:
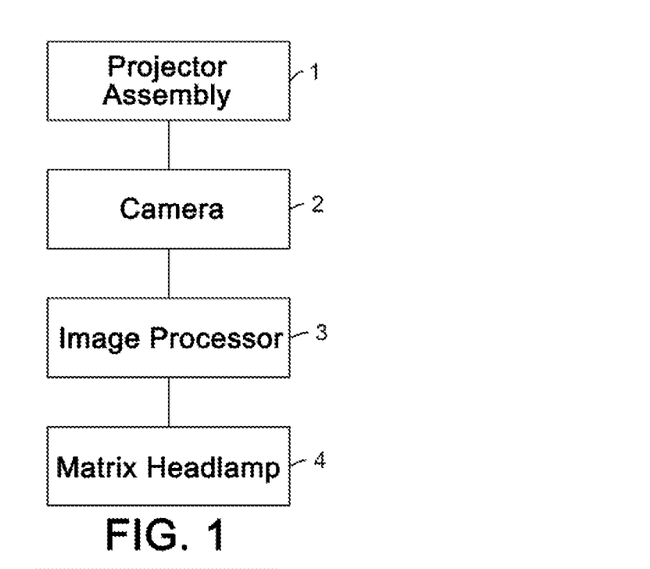
FIG. 1 is a schematic view showing a first electrical connection of a vehicle headlamp according to an embodiment of the present disclosure.
Figure 2:
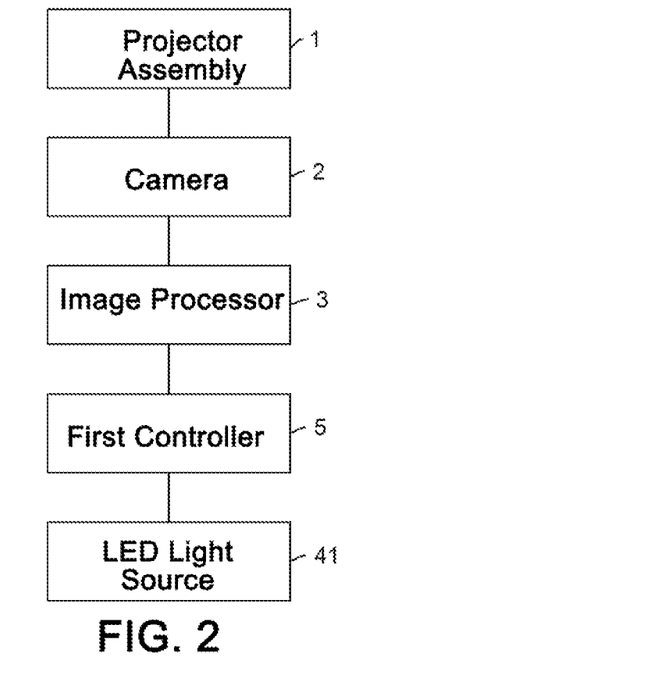
FIG. 2 is a schematic view showing a second electrical connection of a vehicle headlamp according to an embodiment of the present disclosure.

In some embodiments:

Referring to FIG. 1 and FIG. 2, an auto-regulated vehicle headlamp shown in FIG. 1 and FIG. 2 comprises a projector assembly 1, a camera 2, an image processor 3, a matrix headlamp 4, and a first controller 5; the projector assembly 1 is capable of projecting infrared rays, and is configured to project infrared stripes onto a traveling road-surface to which the vehicle is traveling; the infrared stripes are constituted by alternate bright and dark stripes so that corresponding distorted stripes can be formed when an object, during appearing or disappearing on the traveling road-surface, has a changed contour; the camera 2 is configured to capture image information on the distorted stripes; the image processor 3 is in data connection with the camera 2, and is configured to acquire the image information and generate a headlamp control command according to the image information; the matrix headlamp 4 comprises a plurality of LED light sources 41; and the first controller 5 is in data connection with the matrix headlamp 4 and the image processor 3, and is configured to acquire the headlamp control command and adjust the number of LED light sources 41 to be activated and the brightness of the LED light sources 41 according to the headlamp control command.

Referring to FIG. 3, the auto-regulated vehicle headlamp shown in FIG. 3 is different from the auto-regulated vehicle headlamp shown in FIG. 1 and FIG. 2 in that the projector assembly 1 comprises a first infrared projector 101 and a second infrared projector 102, and the auto-regulated vehicle headlamp further comprises a second controller 6 and a third controller 7; the first infrared projector 101 is configured to project alternate bright and dark horizontal stripes onto a traveling road-surface to which the vehicle is traveling; the second controller 6 is in control connection with the first infrared projector 101 and configured to control the first infrared projector 101 to project the horizontal stripes onto the traveling road-surface in a flickering manner; the second infrared projector 102 is configured to project alternate bright and dark vertical stripes onto the traveling road-surface; and the third controller 7 is in control connection with the second infrared projector 102 and configured to control the second infrared projector 102 to project the vertical stripes onto the traveling road-surface in a flickering manner.

Referring to FIG. 4, the projector assembly 1 shown in FIG. 4 comprises an infrared lamp 11, a mask member 12, a reflector 13, a lens assembly 14, and a heat sink 16; the infrared lamp 11 is configured to project infrared rays; the mask member 12 is located at an exit from which the infrared rays are projected; the reflector 13 is assembled correspondingly to the infrared lamp 11, and is configured to reflect the infrared rays projected by the infrared lamp 11 to the mask member 12 to form infrared stripes; the lens assembly 14 comprises a lens holder 141 and a lens 142; the lens 142 is mounted at the exit from which the infrared rays are projected via the lens holder 141, so that the infrared stripes are projected through the lens 142 to the traveling road-surface; and the infrared lamp 11 is disposed on the heat sink 16.

Referring to FIG. 5 and FIG. 6, FIG. 5 and FIG. 6 show a horizontal mask member 12 and a vertical mask member 12, respectively; the mask member 12 comprises a frame 121 and multiple masking blades 122, the multiple masking blades 122 are disposed in parallel, and a strip-shaped light transmission hole 123 is formed by gaps between two adjacent masking blades 122, and the reflector 13 reflects the infrared rays projected by the infrared lamp 11 to the mask member 12 to form the infrared stripes through the strip-shaped light transmission holes 123.

Figure 7:
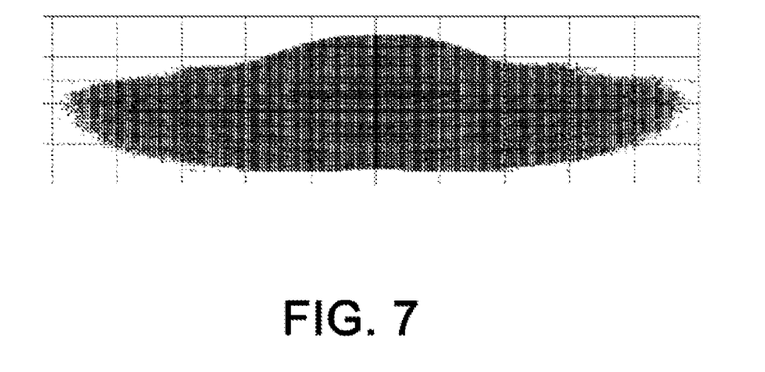
FIG. 7 is a schematic view showing the projection from a vehicle headlamp according to an embodiment of the present disclosure.

FIG. 7 shows a schematic view showing the projection from a vehicle headlamp.

Figure 8:
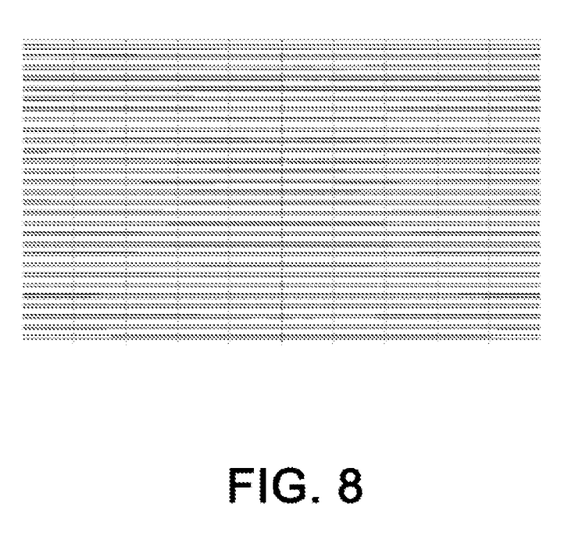
FIG. 8 is a schematic enlarged view showing the projection from a vehicle headlamp according to an embodiment of the present disclosure.

FIG. 8 shows a schematic enlarged view showing the projection from a vehicle headlamp.

Figure 9:
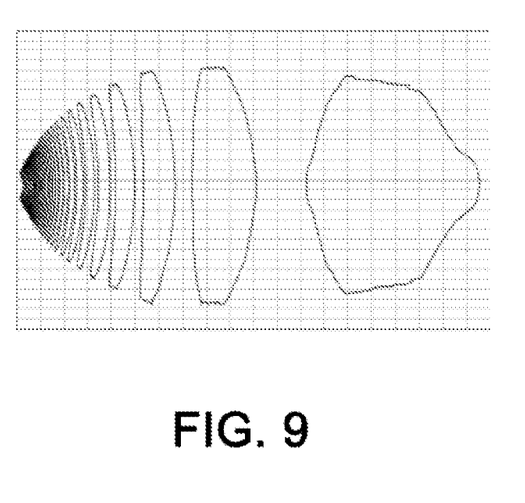
FIG. 9 is a top view showing the projection from a vehicle headlamp according to an embodiment of the present disclosure.

FIG. 9 shows a top view showing the projection from a vehicle headlamp.

Finally, it should be noted that the above embodiments are merely intended to illustrate the technical solutions of the present disclosure, but not intended to limit the present disclosure. Although the present disclosure has been described in detail with reference to the foregoing embodiments, it should be understood by those of ordinary skill in the art that the technical solutions disclosed in the foregoing embodiments may be modified, or some or all of the technical features thereof may be replaced with equivalents; and these modifications or replacements will not cause the spirit of the corresponding technical solutions to depart from the scope of the technical solutions of the embodiments of the present disclosure.

INDUSTRIAL APPLICABILITY

In summary, the present disclosure provides an auto-regulated vehicle headlamp, an automatic regulation method, and a vehicle, which can greatly reduce the cost of the vehicle, and has the effect of automatically controlling the headlamp.

The invention claimed is:

1. An auto-regulated vehicle headlamp, comprising:
   a projector assembly capable of projecting infrared rays, configured to project infrared stripes onto a traveling road-surface;
   the infrared stripes being constituted by alternate bright and dark stripes, so that corresponding distorted stripes can be formed when an object, during appearing or disappearing on the traveling road-surface, has a changed contour;
   a camera configured to capture image information on the distorted stripes;
   an image processor in data connection with the camera and configured to acquire the image information and generate a headlamp control command according to the image information; and
   a matrix headlamp and a first controller, wherein the matrix headlamp comprises a plurality of LED light sources; the first controller is in data connection with the matrix headlamp and the image processor and configured to acquire the headlamp control command and adjust the number of the LED light sources to be activated and a brightness of the LED light sources according to the headlamp control command.

2. The auto-regulated vehicle headlamp according to claim 1, wherein the infrared stripes are constituted by alternate bright and dark horizontal stripes.

3. The auto-regulated vehicle headlamp according to claim 2, wherein the projector assembly comprises a first infrared projector, the first infrared projector being configured to project the alternate bright and dark horizontal stripes onto the traveling road-surface.

4. The auto-regulated vehicle headlamp according to claim 3, wherein the auto-regulated vehicle headlamp further comprises a second controller;
   the second controller is in control connection with the first infrared projector and is configured to control the first infrared projector to project the horizontal stripes onto the traveling road-surface in a flickering manner.

5. The auto-regulated vehicle headlamp according to claim 1, wherein the infrared stripes are constituted by alternate bright and dark vertical stripes.

6. The auto-regulated vehicle headlamp according to claim 5, wherein the projector assembly comprises a second infrared projector, the second infrared projector being configured to project the alternate bright and dark vertical stripes onto the traveling road-surface.

7. The auto-regulated vehicle headlamp according to claim 6, wherein the auto-regulated vehicle headlamp further comprises a third controller;
   the third controller is in control connection with the second infrared projector and is configured to control the second infrared projector to project the vertical stripes onto the traveling road-surface in a flickering manner.

8. The auto-regulated vehicle headlamp according to claim 1, wherein the infrared stripes are constituted by alternate bright and dark horizontal stripes and vertical stripes; and the horizontal stripes and the vertical stripes are alternately arranged.

9. The auto-regulated vehicle headlamp according to claim 8, wherein the projector assembly comprises a first infrared projector and a second infrared projector;

the first infrared projector is configured to project alternate bright and dark horizontal stripes onto the traveling road-surface;
the second infrared projector is configured to project alternate bright and dark vertical stripes onto the traveling road-surface; and
the first infrared projector and the second infrared projector simultaneously perform the projecting, to form a pattern constituted by superimposing the alternating bright and dark horizontal stripes and vertical stripes.

10. The auto-regulated vehicle headlamp according to claim 1, wherein the projector assembly comprises:

an infrared lamp configured to project the infrared rays; and
a mask member provided with a plurality of strip-shaped light transmission holes in parallel and located at an exit from which the infrared rays are projected, so that the infrared rays projected by the infrared lamp are directly emitted to the mask member to form the infrared stripes through the strip-shaped light transmission holes.

11. The auto-regulated vehicle headlamp according to claim 1, wherein the projector assembly comprises:

an infrared lamp configured to project the infrared rays;
a mask member provided with a plurality of strip-shaped light transmission holes in parallel and located at an exit from which the infrared rays are projected; and
a reflector assembled correspondingly to the infrared lamp, and configured to reflect the infrared rays, projected by the infrared lamp, to the mask member, to form the infrared stripes through the strip-shaped light transmission holes.

12. The auto-regulated vehicle headlamp according to claim 10, wherein the mask member is a grating.

13. The auto-regulated vehicle headlamp according to claim 10, wherein the mask member comprises a frame and a plurality of masking blades disposed on the frame, and the plurality of masking blades are disposed in parallel to form the strip-shaped light transmission holes by gaps between the adjacent masking blades.

14. The auto-regulated vehicle headlamp according to claim 10, wherein the auto-regulated vehicle headlamp further comprises:

a lens assembly, wherein the lens assembly comprises a lens holder and a lens;
the lens is mounted, via the lens holder, at the exit from which the infrared rays are projected, so that the infrared stripes are projected through the lens to the traveling road-surface.

15. The auto-regulated vehicle headlamp according to claim 14, wherein the mask member is located at a position of a focal plane of the lens.

16. The auto-regulated vehicle headlamp according to of claim 10, wherein the auto-regulated vehicle headlamp further comprises:

a heat sink,
wherein the infrared lamp is disposed on the heat sink, and is configured such that heat is dissipated from the infrared lamp by the heat sink.

17. The auto-regulated vehicle headlamp according to claim 1, wherein the image information includes vehicle image information;

the first controller is in data connection with the matrix headlamp and the image processor, and is configured to acquire the headlamp control command and adjust the number of the LED light sources to be activated and the brightness of the LED light sources according to the headlamp control command.

18. The auto-regulated vehicle headlamp according to claim 1, wherein the image information includes pedestrian image information, and the headlamp control command includes a flicker adjustment command corresponding to the pedestrian image information;

the first controller is in data connection with the matrix headlamp and the image processor, and is further configured to acquire the flicker adjustment command and control the activation of the flicker of the LED light sources according to the flicker adjustment command.

19. A method for automatically regulating a vehicle headlamp, which is implemented according to the auto-regulated vehicle headlamp according to claim 1, comprising steps of:

projecting infrared stripes onto the traveling road-surface by the projector assembly,
wherein the infrared stripes are constituted by alternate bright and dark stripes so that corresponding distorted stripes can be formed when an object, during appearing or disappearing on the traveling road-surface, has a changed contour;
using the camera to capture image information on the distorted stripes;
using the image processor to acquire the image information and generate a headlamp control command according to the image information; and
using the first controller to acquire the headlamp control command and adjust the number of the LED light sources to be activated and the brightness of the LED light sources according to the headlamp control command.

20. A vehicle, comprising the auto-regulated vehicle headlamp according to claim 1.

* * * * *